2,988,547
1-PHENYL-3-METHOXY; HYDROXY; OR BENZYL-OXY-5-SULFANILAMIDO PYRAZOLE-1,2 AND DERIVATIVES THEREOF

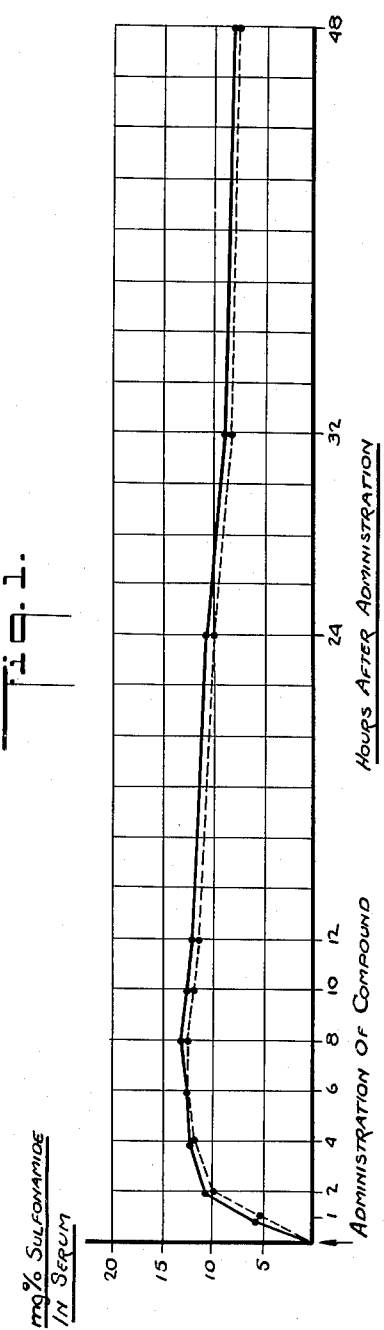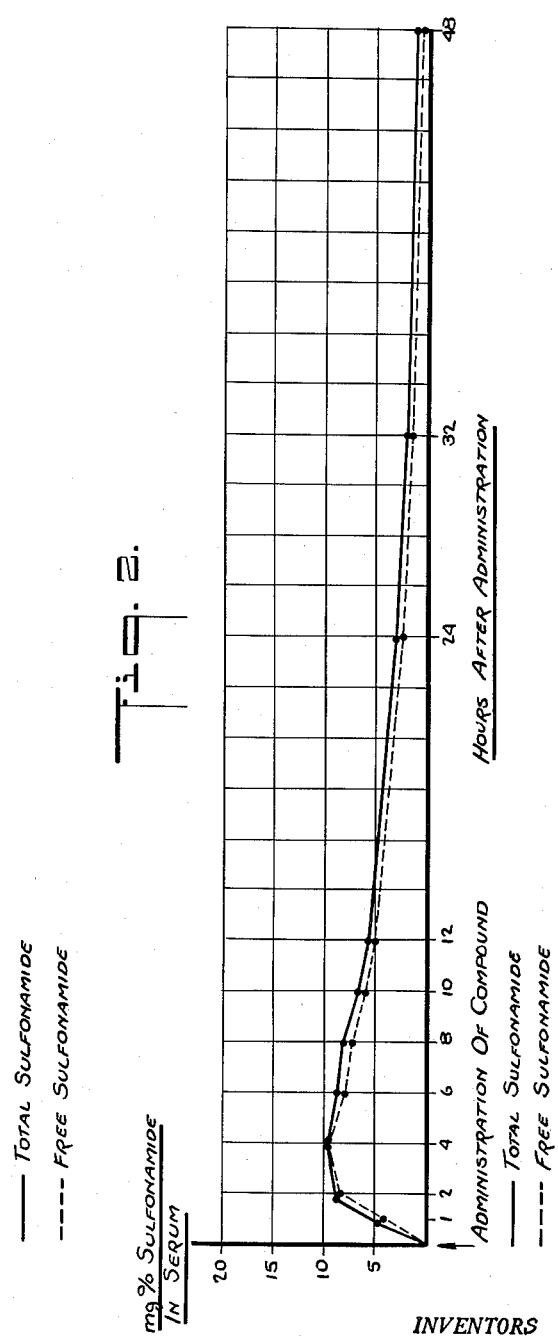
INVENTORS
JOHANN DANIEL ACHELIS
ERICH HAACK
BY RUDI GALL
RUTH HEERDT
WOLFGANG VOEMEL
AGENT

United States Patent Office 2,988,547
Patented June 13, 1961

Johann Daniel Achelis and Erich Haack, Heidelberg, and Rudi Gall, Ruth Heerdt, and Wolfgang Voemel, Mannheim, Germany, assignors to C. F. Boehringer & Soehne, Mannheim-Waldhof, Germany, a company of Germany
Filed Mar. 25, 1960, Ser. No. 17,593
Claims priority, application Germany Mar. 28, 1959
5 Claims. (Cl. 260—239.9)

The present invention relates to a valuable pyrazole compound and more particularly to 1-phenyl-3-methoxy-5-sulfanilamido pyrazole and to a process of making same.

There have been known only a few sulfoamides of the pyrazole series. 5-sulfanilamido pyrazole-1,2 has been reported to have a good effect against pneumococci. 5-sulfanilamido-3-methyl pyrazole-1,2 and 5-sulfanilamido-3-methyl-1-phenyl-pyrazole-1,2 have also been described. Recently 5-sulfanilamido-1-phenyl pyrazole-1,2, i.e. a phenyl pyrazole compound which is unsubstituted in 3-position has been marketed. These known sulfanilamido pyrazole compounds, however, have a number of disadvantages. For instance, 5-sulfanilamido-3-methyl pyrazole-1,2 produces a rather low sulfonamide blood level, i.e., its absorption by the mucous membranes of the intestines is unsatisfactory so that it cannot be employed in the treatment of diseases which are ordinarily and successfully treated with sulfonamides such as pneumonia, angina, cystopyelitis, cholecystitis, and the like. 1-phenyl-5-sulfanilamido pyrazole-1,2 and 1-phenyl-3-methyl-5-sulfanilamido pyrazole-1,2 have a rather unsatisfactory effect upon streptococcus infections as has been proved by tests with mice infected intraperitoneally with a highly pathogenic *Streptococcus pyogenes* Aronson species.

It is one object of the present invention to provide a new and valuable sulfonamide of the pyrazole series which is substituted by a phenyl radical in 1-position and by a methoxy group in 3-position.

Another object of the present invention is to provide a new and valuable pharmaceutical which has a high chemotherapeutic activity against both gram-positive and gram-negative bacteria, which is highly soluble so that it is readily absorbed into the blood stream, and which provides a long-lasting high blood level.

A further object of the present invention is to provide a simple and effective process of making such a compound.

These and other objects of the present invention and advantageous features thereof will become apparent as the description proceeds.

It has been found that 1-phenyl-3-methoxy-5-sulfanilamido pyrazole of the formula

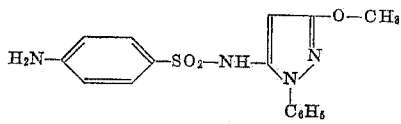

is an especially valuable sulfonamide. As stated above this new compound has a very high activity against both gram-positive and gram-negative bacteria. Furthermore it produces long-lasting high blood levels in the body which property is of great advantage for its therapeutical use. Due to its high solubility it is readily absorbed by the body. The corresponding acetylated compound is also readily soluble so that there is no danger that this compound will crystallize in the kidneys or in the urinary tract. This favorable combination of physico-chemical, bacteriostatic, and pharmacological properties renders the new compound especially valuable and provides a new compound which is significantly superior to sulfonamides of the pyrazole series known heretofore.

The sulfanilamido pyrazole according to the present invention can be obtained according to known processes. For instance, sulfonyl halides of the formula

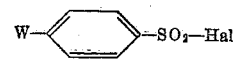

wherein

W is an amino group or a group convertible into an amino group, such as an acylamino or a nitro group are reacted with 1-phenyl-3-methoxy-5-amino pyrazole-1,2. The substituent W, if necessary, is converted into the amino group.

In place of 1-phenyl-3-methoxy-5-amino pyrazole-1,2, amino pyrazoles of the formula

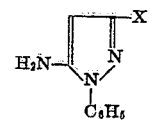

wherein

X is a hydroxyl group or a group which can be converted into the hydroxyl group, for instance, a tosylate group or another sulfonate group, can be used as the one reaction component for condensation with the sulfonyl halide and the substituent X in the resulting condensation product is then subsequently converted into the methoxy group according to known methods.

The "reciprocal" method, i.e. the reaction of the corresponding halogopyrazole compounds with sulfonyl amides or their alkali metal salts can also be employed.

The following examples serve to illustrate the present invention without, however, limiting the same thereto.

EXAMPLE 1

45.1 g. of 1-phenyl-3-methoxy-5-amino pyrazole-1,2 hydrochloride (melting point: 180° C.) which has been prepared by methylating the corresponding 3-hydroxy pyrazole compound by means of an ethereal diazomethane solution with the addition of methanol, and subsequent precipitation with hydrogen chloride (see J. Am. Chem. Soc., vol. 65 (1943), p. 52) and 98.1 g. of acetyl sulfanilyl chloride are suspended in 200 cc. of absolute methylene chloride. An about 20% solution of trimethylamine in dry benzene is added drop by drop to this mixture while heating under reflux and stirring, until the resulting solution is rendered exactly neutral. This solution is refluxed for 6 hours during which time the pH-value is controlled continuously and additional trimethylamine solution is added if required. After the addition of 200 cc. of water, the organic solvents are distilled off in a vacuum. The aqueous solution is allowed to cool and the precipitated crystals are filtered off by suction. 99.8 g. (yield: 86%) of 1-phenyl-3-methoxy-5-(bis-acetyl sulfanilyl)-amino pyrazole-1,2 are obtained. Melting point, after recrystallization from ethanol: 239–241° C.

Said bis-sulfonyl compound is refluxed with 7.75 moles of sodium hydroxide in the form of a 10% aqueous solution until a clear solution has been formed. Heating for about 90 minutes is required. The reaction mixture is then heated for another hour, purified with animal charcoal, filtered, and acidified with dilute hydrochloric acid. In this manner 53.3 g. (yield: 90%) of 1-phenyl-3-methoxy-5-sulfanilamido pyrazole-1,2 are obtained. Melting point, after recrystallization from ethanol: 154–156° C.

1-phenyl-3-methoxy-5-acetyl sulfanilamido pyrazole-1,3 is obtained therefrom by acetylation with acetyl chloride and pyridine in the usual manner. Melting point, after recrystallization from a mixture of ethanol and water (1:1) 105–108° C.

The reaction described above can also be carried out with the free 1-phenyl-3-methoxy-5-amino pyrazole-1,2 base (melting point: 65–67° C.). In place of trimethylamine, other tertiary amines can be used as condensing agents, for instance, dimethyl ethylamine or pyridine. An especially advantageous method of condensation consists in introducing gaseous trimethylamine into a suspension of the components in absolute ethylene chloride.

EXAMPLE 2

7 g. of 1-phenyl-3-benzyloxy-5-amino pyrazole-1,2 prepared by reacting the potassium salt of 1-phenyl-3-hydroxy-5-amino pyrazole-1,2 with benzylchloride in dimethyl formamide at 50° C. and having the melting point of 82–83.5° C. after recrystallization from ethanol, and 13.5 g. of acetyl sulfanilyl chloride are suspended in 150 cc. of anhydrous ethylene chloride. Gaseous trimethylamine is introduced into the mixture to a pH-value of 8.0. Stirring is continued for one hour while keeping the pH at 8.0 by the addition of trimethylamine, if necessary. Water is added to the resulting clear solution and the precipitated crystals are filtered off. 15 g. (i.e. a yield of 86%) of 1-phenyl-3-benzyloxy-5-(bis-acetyl sulfanilyl) amino pyrazole-1,2 of the melting point 102° C. (with decomposition) are obtained.

The benzyl group is split off by dissolving said compound in a mixture of methanol and dioxane (2:1) and introducing hydrogen into the solution in the presence of a palladium catalyst. On concentrating the solution by evaporation in a vacuum, 1-phenyl-3-hydroxy-5-(bis-acetyl sulfanilyl) amino pyrazole-1,2 crystallizes; melting point: 227° C. (with decomposition).

The crude compound is suspended in a mixture of methanol and dimethyl acetamide (4:1). An ethereal diazomethane solution is added thereto until the color of the mixture remains yellow. Thereby rapid dissolution and vigorous evolution of nitrogen takes place. Excess diazomethane is destroyed by the addition of glacial acetic acid. The resulting solution is concentrated by evaporation in a vacuum and the concentrate is diluted with water, thereby causing crystallization. The resulting 1-phenyl-3-methoxy-5-(bis-acetyl sulfanilyl) amino pyrazole-1,2 is saponified in the same manner as described in Example 1. The resulting product of hydrolysis is recrystallized from ethanol. It proved to be identical with 1-phenyl-3-methoxy-5-sulfanilamido pyrazole-1,2 obtained according to Example 1.

The following tests demonstrate the superiority of the new 1-phenyl-3-methoxy-5-sulfanilamido pyrazole-1,2, hereinafter designated as "compound A," over the known 1-phenyl-5-sulfanilamido pyrazole-1,2 which is unsubstituted in 3-position and which is designated hereinafter as "compound B." They also prove the clinical utility of the new compound.

TEST A

Solubility in water

The solubility in water at a temperature of 37° C. and different pH-values is substantially the same with both sulfonamides. However, since compound A is excreted more slowly than compound B, its relative solubility is higher than that of compound B. Thus, even under extremely unfavorable conditions, such as very small amounts of urine, crystallization in the urinary passages is excluded. The solubilities in water at 37° C. are given in Table I in mg./cc.:

TABLE I

| Compound | pH 5.5 | pH 7.6 |
| --- | --- | --- |
| 1-phenyl-3-methoxy-5-sulfanilamido pyrazole | 22 | 320 |
| 1-phenyl-3-methoxy-5-acetyl sulfanilamido pyrazole | 65 | 1,202 |
| 1-phenyl-5-sulfanilamido pyrazole | 19 | 305 |
| 1-phenyl-5-acetyl sulfanilamido pyrazole | 45 | 665 |

TEST B

The acute toxicity of 1-phenyl-3-methoxy-5-sulfanilamide pyrazole-1,2, determined by intravenous administration to mice, is only about ⅔ of that of compound B as shown in the following Table II which gives the dose causing death of 50% of the animals ($LD_{50}$):

TABLE II

| Compound | $LD_{50}$, g./kg. |
| --- | --- |
| Compound A | 1.0 |
| Compound B | 0.42 |

TEST C

Bacteriostatic effect in vitro

The bacteriostatic effect of compounds A and B was determined on a large number of pathogenic microorganisms. The following Table III illustrates this effect on a few of said microorganisms, namely on bacteria which are responsible for diseases that are preferably treated with sulfonamides. These tests in vitro serve merely as a base for the therapeutical tests with animals which will be described hereinafter and which are even more adapted for an evaluation of the sulfonamides than said in vitro tests.

TABLE III

Bacteriostatic tests with 1-phenyl-3-methoxy-5-sulfanilamido pyrazole

| Microorganism | Dilutions of the inoculation with the microorganism in the ratio of 1: | Absolute bacteriostatic minimum concentration ($\mu$g./ml.) | |
| --- | --- | --- | --- |
| | | Compound A | Compound B |
| Staphylococci | $10^4$ | 8 | 8 |
| | $10^5$ | 4 | 2 |
| | $10^6$ | 2 | 2 |
| Streptococci | $10^4$ | 8 | 16 |
| | $10^5$ | 4 | 4 |
| | $10^6$ | 2 | 2 |
| Pneumococci | $10^4$ | 8 | 16 |
| | $10^5$ | 4 | 4 |
| | $10^6$ | 2 | 4 |
| Listeriae | $10^4$ | 4 | 4 |
| | $10^5$ | 4 | 4 |
| | $10^6$ | 2 | 2 |

It is evident that the new 1-phenyl-3-methoxy-5-sulfanilamido pyrazole-1,2 is at least as effective as the known 1-phenyl-5-sulfanilamido pyrazole-1,2 which is unsubstituted in 3-position.

TEST D

Therapeutic tests with mice

Therapeutic tests with mice are considered as the most important base for evaluating the therapeutical effect of sulfonamides.

In the following tests while inbred mice were infected intraperitoneally with many times the lethal amount of the microorganism. The infected mice received, thereafter, perorally specific daily doses of the two compounds A or B in the form of their free bases. The therapeutic effectiveness of the sulfonamides was evaluated by the number of animals surviving for five days after treatment was suspended. All infected control animals which were not treated, died within 5 days after the infection.

Each group of mice used in these tests consisted of at least 15 animals and in most cases of 20 animals.

The following Table IV clearly proves the superiority of 1-phenyl-3-methoxy-5-sulfanilamido pyrazole-1,2 over the known 1-phenyl-5-sulfanilamido pyrazole-1,2.

TABLE IV

| Microorganism | daily dose, mg./kg. | Compound | Surviving mice in percent of total No. | |
|---|---|---|---|---|
| | | | On the fifth day (end of treatment) | On the tenth day of test (5 days after termination of treatment) |
| Streptococcus pyogenes (Strain 77). | 20 | A<br>B | 88<br>35 | 82<br>25 |
| Diplococcus pneumoniae (Type II). | 320 | A<br>B | 90<br>20 | 40<br>0 |
| Salmonella typhimurium | 320 | A<br>B | 60<br>25 | 0<br>0 |
| Listeria monocytogenes Strain 1145). | 80 | A<br>B | 95<br>39 | 95<br>10 |

*Clinical tests with humans to determine the sulfonamide serum level*

At present it is justified to introduce new sulfonamides is therapy provided they produce long-lasting blood levels, so that relatively small doses given in large intervals are sufficient to successfully treat infectious diseases.

In these tests 1-phenyl-3-methoxy-5-sulfanilamido pyrazole-1,2 and 1-phenyl-5-sulfanilamido pyrazole-1,2 were administered to volunteers in a single oral dose of 15 mg./kg. of body weight (about 1 g. of an adult person of average weight). The serum levels of total sulfonamide and free sulfonamide were determined at various intervals according to the method of Bratton and Marshal. Both sulfonamides were administered to the same 4 test persons in exactly the same manner. The values observed thereby are plotted in the attached curves. The curves illustrated in FIG. 1 show the mean serum level on administration of 1-phenyl-3-methoxy-5-sulfanilamido pyrazole-1,2 while the curves illustrated in FIG. 2 show the mean serum level on administration of 1-phenyl-5-sulfanilamido pyrazole-1,2. It is evident that the serum levels with compound A are substantially higher than do not decrease as rapidly as those with compound B. The ratio of the total sulfonamide serum level of compound B to compound A is as follows:

4 hours after administration 1:1.3
8 hours after administration 1:1.6
12 hours after administration 1:2.2
24 hours after administration 1:3.5
48 hours after administration 1:8.0

The half-life period, i.e. the period of time within which a specific serum level decreases to half its initial value was on the average 43 hours for 1-phenyl-3-methoxy-5-sulfanilamido pyrazole-1,2 and only 13 hours for 1-phenyl-5-sulfanilamido pyrazole-1,2.

We claim:
1. 1-phenyl-3-methoxy-5-sulfanilamido pyrazole-1,2.
2. 1-phenyl-3-methoxy-5-(bis-acetyl sulfanilyl)amino pyrazole-1,2.
3. 1-phenyl-3-methoxy-5-acetyl sulfanilamido pyrazole-1,2.
4. 1-phenyl-3-hydroxy-5-(bis-acetyl sulfanilyl)amino pyrazole-1,2.
5. 1-phenyl-3-benzyloxy-5-(bis-acetyl sulfanilyl)amino pyrazole-1,2.

References Cited in the file of this patent
UNITED STATES PATENTS 2,858,309    Druey et al. _____ Oct. 28, 1958

FOREIGN PATENTS 1,049,384    Germany _____ Jan. 29, 1959
876,296      France _____ July 27, 1942